(12) United States Patent
Roth et al.

(10) Patent No.: US 9,327,920 B2
(45) Date of Patent: May 3, 2016

(54) APPARATUS AND METHOD FOR STACKING ITEMS

(71) Applicant: Alliance Machine Systems International, LLC, St. Louis, MO (US)

(72) Inventors: Curtis A. Roth, Post Falls, ID (US); Arnoldus Kox, Eersel (NL)

(73) Assignee: Alliance Machine Systems International, LLC, St. Louis, MO (US)

( * ) Notice: Subject to any disclaimer, the term of this patent is extended or adjusted under 35 U.S.C. 154(b) by 101 days.

(21) Appl. No.: 13/719,979

(22) Filed: Dec. 19, 2012

(65) Prior Publication Data

US 2013/0209213 A1    Aug. 15, 2013

Related U.S. Application Data

(60) Provisional application No. 61/580,812, filed on Dec. 28, 2011.

(51) Int. Cl.
| | | |
|---|---|---|
| *B65G 57/03* | (2006.01) | |
| *B65G 57/00* | (2006.01) | |
| *B65G 57/06* | (2006.01) | |

(52) U.S. Cl.
CPC ............. *B65G 57/03* (2013.01); *B65G 57/00* (2013.01); *B65G 57/06* (2013.01)

(58) Field of Classification Search
CPC ...... B65G 57/00; B65G 57/03; B65G 57/112; B65G 57/14; B65G 57/02; B65G 57/06; B65G 61/00; B65H 29/36; B65H 29/34; B65H 31/34; B65H 31/36; B65B 35/246; B65B 35/40

USPC .......... 414/793.4, 793.5, 793.6, 793.8, 794.4, 414/794.5, 797.7, 794.7, 794.2; 271/73, 271/190, 191

See application file for complete search history.

(56) References Cited

U.S. PATENT DOCUMENTS

| | | | |
|---|---|---|---|
| 1,752,648 | A | 4/1930 | Matthews |
| 2,467,423 | A | 4/1949 | Bruker |

(Continued)

FOREIGN PATENT DOCUMENTS

| | | |
|---|---|---|
| CA | 1319161 | 6/1993 |
| DE | 21 14 865 | 10/1972 |

(Continued)

OTHER PUBLICATIONS

Herman, Michael A., "An Introduction to Automated Palletizing", Anderson Technical Services, Inc., Apr. 21, 2000.

(Continued)

*Primary Examiner* — Saul Rodriguez
*Assistant Examiner* — Lynn Schwenning
(74) *Attorney, Agent, or Firm* — Thompson Coburn LLP

(57) ABSTRACT

A method and apparatus are disclosed that allow items to be placed on a stack of items in a manner that minimizes interference with the existing stack. Further, a method and apparatus are disclosed for stacking items such that marking of the items is minimized while the item is stacked. In some embodiments, the method and apparatus may include employing a plurality of forks, where a first fork in the plurality includes a belt that rotates at least partially within a tapered housing of the fork. In some embodiments, the plurality of forks is vertically movable, and the method and apparatus may include a squaring mechanism that is separate from the plurality of forks. The overall throughput of the method and apparatus may be increased by employing this independent squaring mechanism.

12 Claims, 15 Drawing Sheets

(56) References Cited

U.S. PATENT DOCUMENTS

| | | | |
|---|---|---|---|
| 3,507,489 A | | 4/1970 | Wilshin et al. |
| 3,833,132 A | * | 9/1974 | Alduk .................. 414/793.8 |
| 3,892,168 A | | 7/1975 | Grobman |
| 4,043,459 A | * | 8/1977 | Moreau .................. B65G 57/03 414/789.5 |
| 4,073,223 A | | 2/1978 | Crawford |
| 4,162,016 A | * | 7/1979 | Schmitt ................ 414/794.3 |
| 4,189,965 A | | 2/1980 | Kollann |
| 4,195,959 A | * | 4/1980 | Schmitt ................ 414/788.9 |
| T998,009 I4 | * | 9/1980 | Bevan .................. 414/793.5 |
| 4,385,537 A | | 5/1983 | Wolf |
| 2,136,404 A | | 9/1984 | Bobst |
| 4,486,012 A | | 12/1984 | Bock et al. |
| 4,902,195 A | * | 2/1990 | Lucas .................. B65G 57/06 198/774.1 |
| 4,966,521 A | | 10/1990 | Frye et al. |
| 4,977,828 A | | 12/1990 | Douglas |
| 5,026,249 A | | 6/1991 | Shill |
| 5,366,217 A | | 11/1994 | Tokuno et al. |
| 5,567,113 A | * | 10/1996 | Mumper .................. 414/791.6 |
| 5,702,100 A | | 12/1997 | Novick et al. |
| 5,878,864 A | * | 3/1999 | Feldkamper ................ 198/409 |
| 5,904,465 A | | 5/1999 | Fernandez |
| 5,938,191 A | | 8/1999 | Morrison et al. |
| 5,950,510 A | | 9/1999 | Scheffer et al. |
| 5,951,238 A | | 9/1999 | Duecker |
| 6,000,531 A | | 12/1999 | Martin |
| 6,131,901 A | | 10/2000 | Hirohata |
| 6,146,084 A | * | 11/2000 | Doyle .................. 414/788.9 |
| 6,234,473 B1 | | 5/2001 | Morgan et al. |
| 6,270,067 B1 | | 8/2001 | Bergmann et al. |
| 6,427,097 B1 | | 7/2002 | Martin et al. |
| 6,557,846 B2 | | 5/2003 | Martin et al. |
| 6,986,635 B2 | | 1/2006 | Talken et al. |
| 7,052,009 B2 | | 5/2006 | Roth |
| 7,104,747 B2 | | 9/2006 | Talken et al. |
| 7,416,073 B1 | | 8/2008 | Talken et al. |
| 7,887,040 B2 | | 2/2011 | Roth |
| 8,000,837 B2 | | 8/2011 | Allen et al. |
| 2003/0091421 A1 | * | 5/2003 | Piche et al. .................. 414/793.4 |
| 2004/0245071 A1 | | 12/2004 | Giffin |
| 2004/0251603 A1 | | 12/2004 | Roth |
| 2006/0120850 A1 | * | 6/2006 | Clark .................. B65G 57/03 414/789.5 |
| 2008/0019818 A1 | * | 1/2008 | Kent et al. .................. 414/788.1 |
| 2011/0285080 A1 | | 11/2011 | Gendreau et al. |
| 2012/0099956 A1 | * | 4/2012 | Diehr et al. .................. 414/728 |

FOREIGN PATENT DOCUMENTS

| | | |
|---|---|---|
| DE | 2225910 A1 | 12/1973 |
| DE | 23 43 678 | 3/1975 |
| DE | 3033793 A1 | 3/1982 |
| DE | 39 38 536 | 6/1990 |
| DE | 198 17 064 | 4/1999 |
| DE | 20023213 | 6/2003 |
| DE | 10 2004 029037 | 12/2005 |
| EP | 0 150 655 | 8/1985 |
| EP | 0 173 959 | 3/1986 |
| EP | 0 876 979 | 11/1998 |
| EP | 1 072 548 | 1/2001 |
| EP | 1155998 A1 | 11/2001 |
| FR | 2710042 | 3/1995 |
| JP | 60220753 | 11/1985 |
| JP | 5058530 | 3/1993 |
| JP | 2006 044858 | 2/2006 |
| NL | 8801528 A | 1/1990 |
| WO | 92/06914 | 4/1992 |
| WO | 99/00305 | 1/1999 |

OTHER PUBLICATIONS

European Search Report dated Jan. 23, 2015 for European Patent Application No. 14183750.0, 8 pages.

* cited by examiner

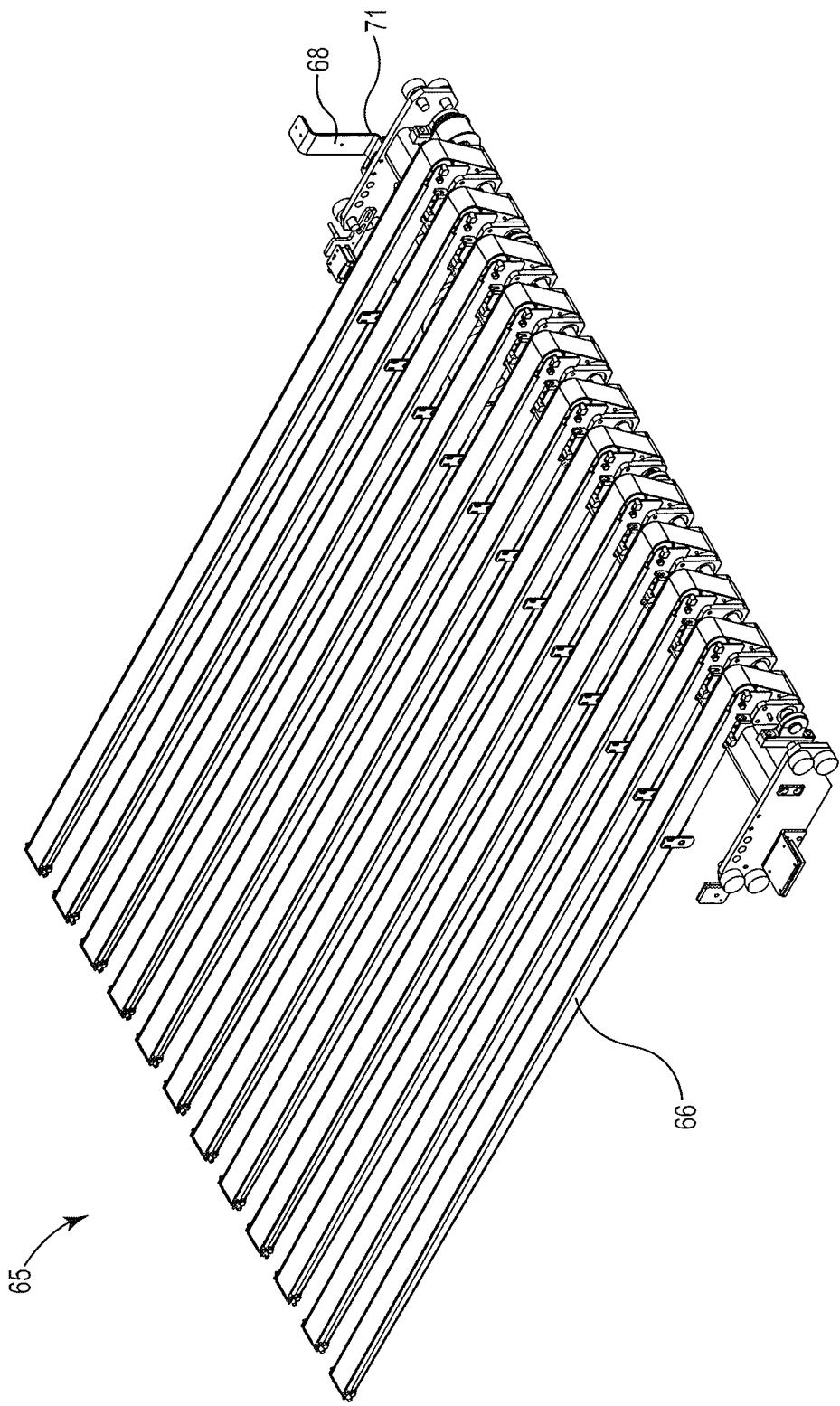

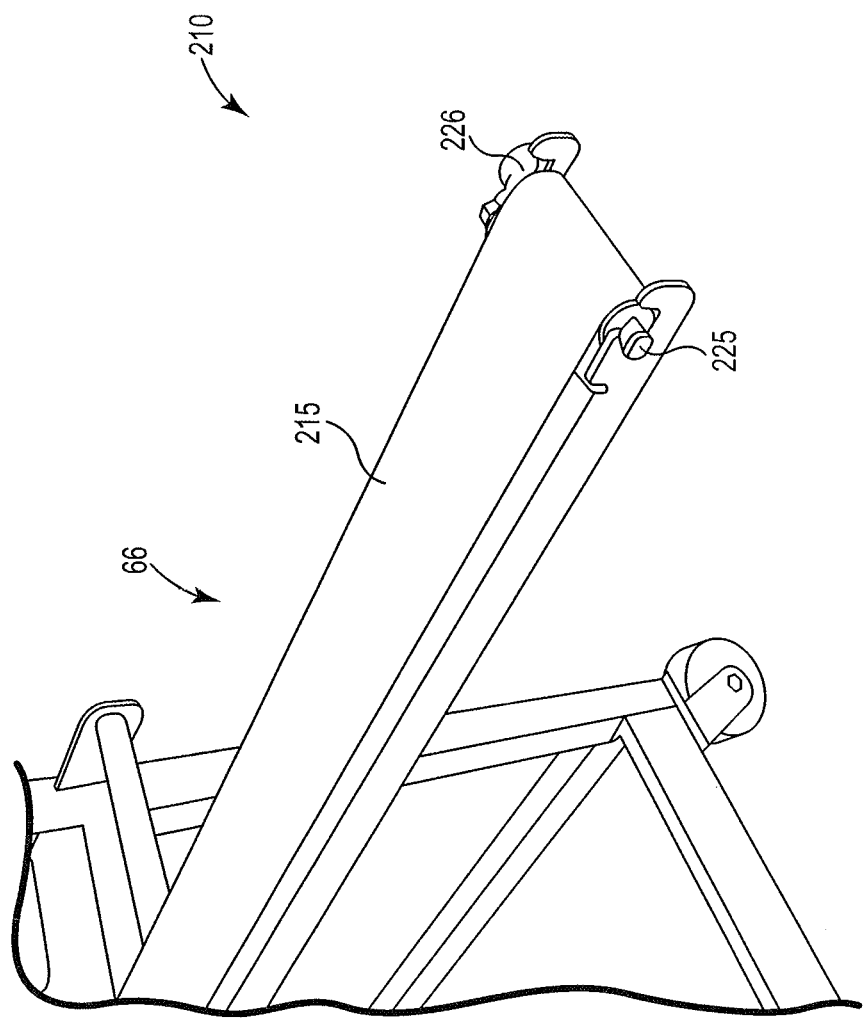

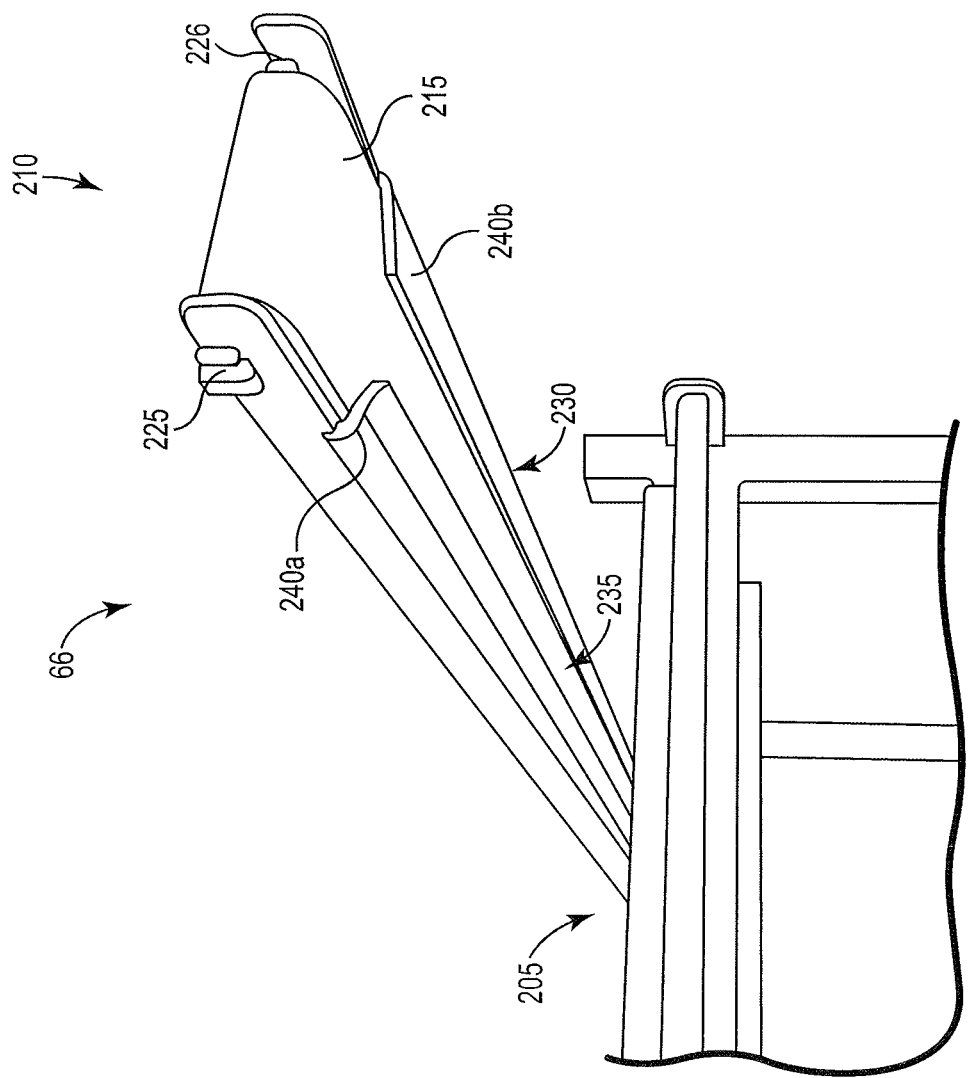

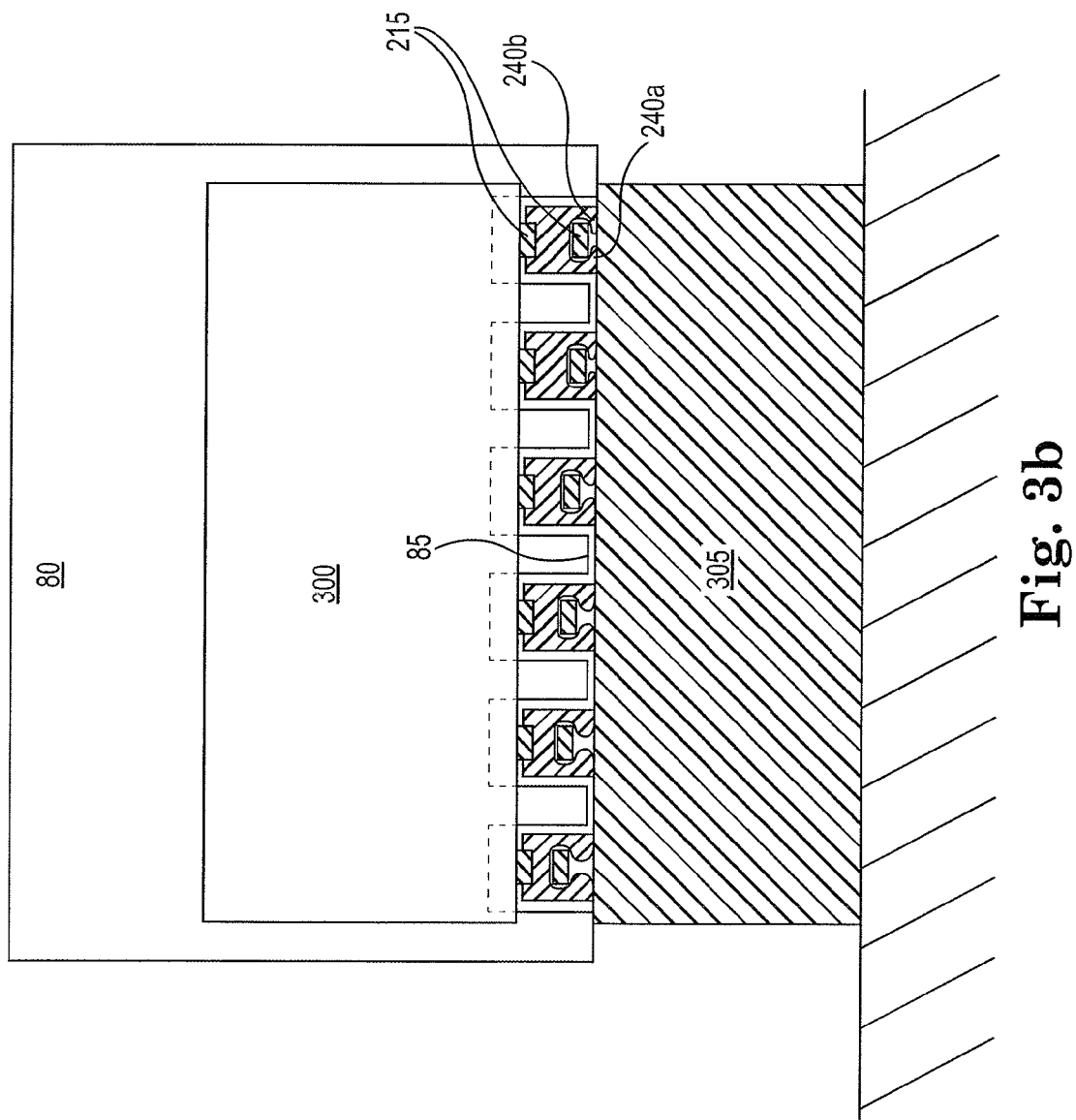

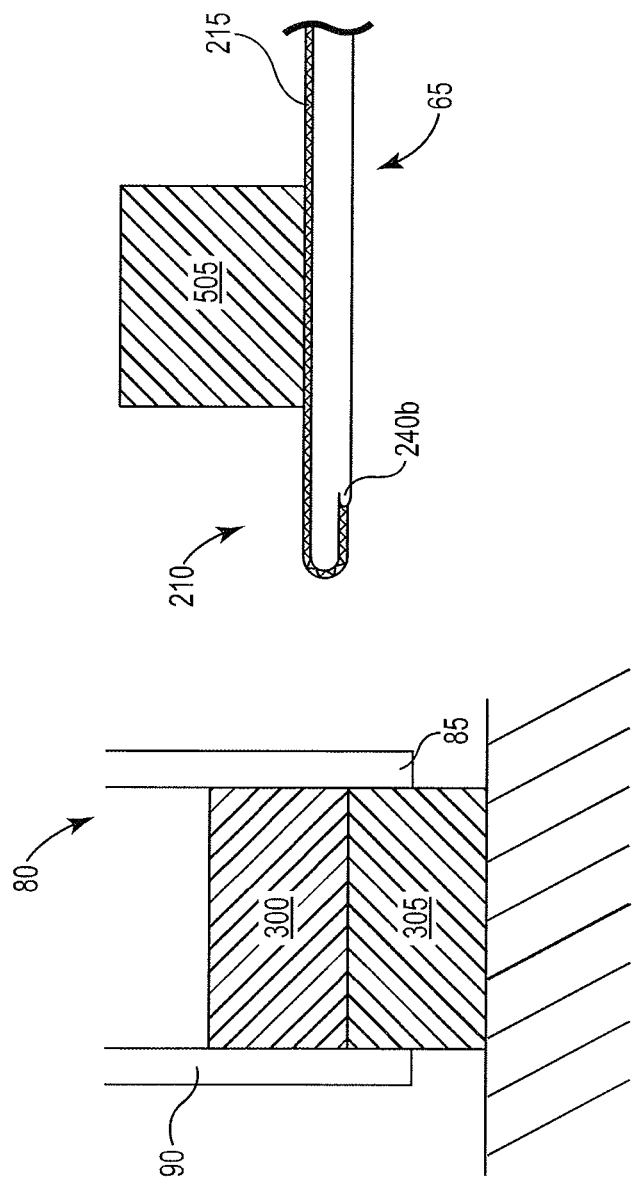

APPARATUS AND METHOD FOR STACKING ITEMS

FIELD OF THE INVENTION

The present disclosure relates generally to automated stacking devices, and in particular, to automated stacking devices that optimize the process of stacking items.

BACKGROUND OF THE INVENTION

Automated stacking devices, sometimes referred to as "palletizers," are often used in factory settings to organize or stack items. The items these palletizers stack may include a variety of things, such as boxes made from corrugated board, paperboard, and/or fiberboard. The items are usually stacked onto frames or pallets made of wood, metal, and/or plastic. These pallets hold the products for transportation purposes.

One problem with conventional palletizers comes when items are stacked successively on top of each other. Many conventional palletizers, when attempting to stack a second item on top of a previously stacked item, alter the position of the previously stacked item. For example, a conventional palletizer may accidentally knock over a previously stacked box when attempting to place a second box on top of the previously stacked box.

Also, many conventional palletizers convey items to be stacked along conveyor belts. These conveyor belts may make contact with a previously stacked item as they convey a second item and cause the previously stacked item to be displaced when making contact with the conveyor belt. In an attempt to solve the problem of the conveyor belts coming into contact with previously stacked items, some conventional palletizers attempt to vertically separate the conveyor belt assembly sufficiently far away from the stack in hopes that the conveyor belt and/or palletizer does not come into contact with previously stacked items. Unfortunately, with this solution, the conveyor belt assembly carrying the second item is now too far away from the previously stacked item, thereby causing the second item to be dropped from excessive heights onto the previously stacked, which can result in the stacked items becoming damaged upon impact.

Other conventional stacking apparatuses utilize progressively thinner metal forks to stack items. One such apparatus is disclosed in U.S. Pat. No. 4,902,195, titled "Device for Automatically Piling up Flat Elements," issued Feb. 20, 1990 ("the '195 patent), and incorporated by reference herein in its entirety. Stacking apparatuses of this type often employ a backstop mechanism, such as item 33 of the '195 patent, where the metal forks are retracted against such backstop mechanisms to place an item on top of a previously stacked item. In these apparatuses, the metal forks can be placed close to the previously stacked item. Unfortunately, the drag of the metal fork pulling back on the item against the backstop can alter the position of a previously placed item and/or leave marks on the item being stacked.

As part of the automated stacking process, stacking devices often perform two basic operations—lifting and squaring. Lifting generally involves moving items to appropriate vertical positions for stacking whereas squaring generally involves aligning multiple items to each other such that the items form right angles. Conventional stacking devices often employ squaring mechanisms along with the lifting mechanisms. This may result in slower overall throughput of the stacking device, for example, in some conventional approaches, the lift mechanism must remain in place until a stack of items is completed and exited the squaring mechanism. The apparatus disclosed in the '195 patent has this problem as it includes a vertically movable table 7 with the backstop mechanism 33 attached. Items 71 enter the stacking device on the vertically movable table 7 and the backstop 33 is used to square items after they are placed on the stack. See e.g., FIG. 3 of the '195 patent. Because the backstop 33 is actually part of the table 7, the table 7 remains stationary until the item 71 has been squared by the backstop 33 and may be limited from obtaining another item to place on the stack. As a result, the overall throughput of the stacking device is limited.

Accordingly, there is a continuing need in the art for automated stacking devices that overcome one or more of the limitations of conventional approaches.

BRIEF SUMMARY OF THE INVENTION

The present disclosure is directed to an apparatus and method for stacking items that has particular application for stacking sheets of corrugated board, paperboard, fiberboard, or other sheet material from an entry or line conveyor or other delivery means.

In one embodiment, the present disclosure relates to a stacking apparatus including a table and a plurality of forks coupled to the table. The forks may be adjustable to move with respect to the table. The stacking apparatus may further include a backstop that interdigitates with the forks, where a first fork within the plurality of forks includes a belt that rotates at least partially within a housing of the first fork as the backstop moves in a lateral direction.

In another embodiment, the present disclosure relates to a method of stacking a plurality of items that includes loading a first item onto a plurality of forks. The method may also include adjusting a position of the forks in a substantially vertical direction such that the forks rest upon a second item while a plurality of belts coupled to the forks are rotated, thereby moving the first item laterally toward the second item. The method also may include adjusting a position of a backstop such that the backstop interdigitates with the forks, and advancing the backstop laterally toward the second item while concurrently rotating the belts.

In yet another embodiment, the present disclosure relates to a stacking apparatus including a first gantry, a plurality of belt covered forks coupled to the first gantry and adjustable to move with respect to the first gantry, and a squaring mechanism coupled to a second gantry. The squaring mechanism may be adjustable to move with respect to first gantry and the plurality of forks may be capable of obtaining items for stacking as the squaring mechanism operates.

In yet another embodiment, the present disclosure relates to a stacking apparatus including a table and a plurality of forks coupled to the table and adjustable to move with respect to the table. At least one fork in the plurality may include a first belt that rotates at least partially within a first housing of the fork and a second belt that rotates at least partially within a second housing of the fork.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 1c is a rear isometric view of a plurality of forks in accordance with one embodiment of the present disclosure.

FIG. 2b is a top perspective view of a fork as seen from the distal end in accordance with one embodiment of the present disclosure.

FIG. 2c is a bottom perspective view of a fork as seen from the distal end in accordance with one embodiment of the present disclosure.

FIG. 3b is a section view taken along line BB' of FIG. 3a in accordance with one embodiment of the present disclosure.

FIG. 5 is a section view of a backstop and squaring plate in accordance with one embodiment of the present disclosure.

The use of the same reference numerals in different drawings indicates similar or identical items.

DETAILED DESCRIPTION

The various embodiments of the apparatus and method for stacking items in accordance with the present disclosure may be used with an automated stacking device having forks with integrated roller belts.

Figure 1A:
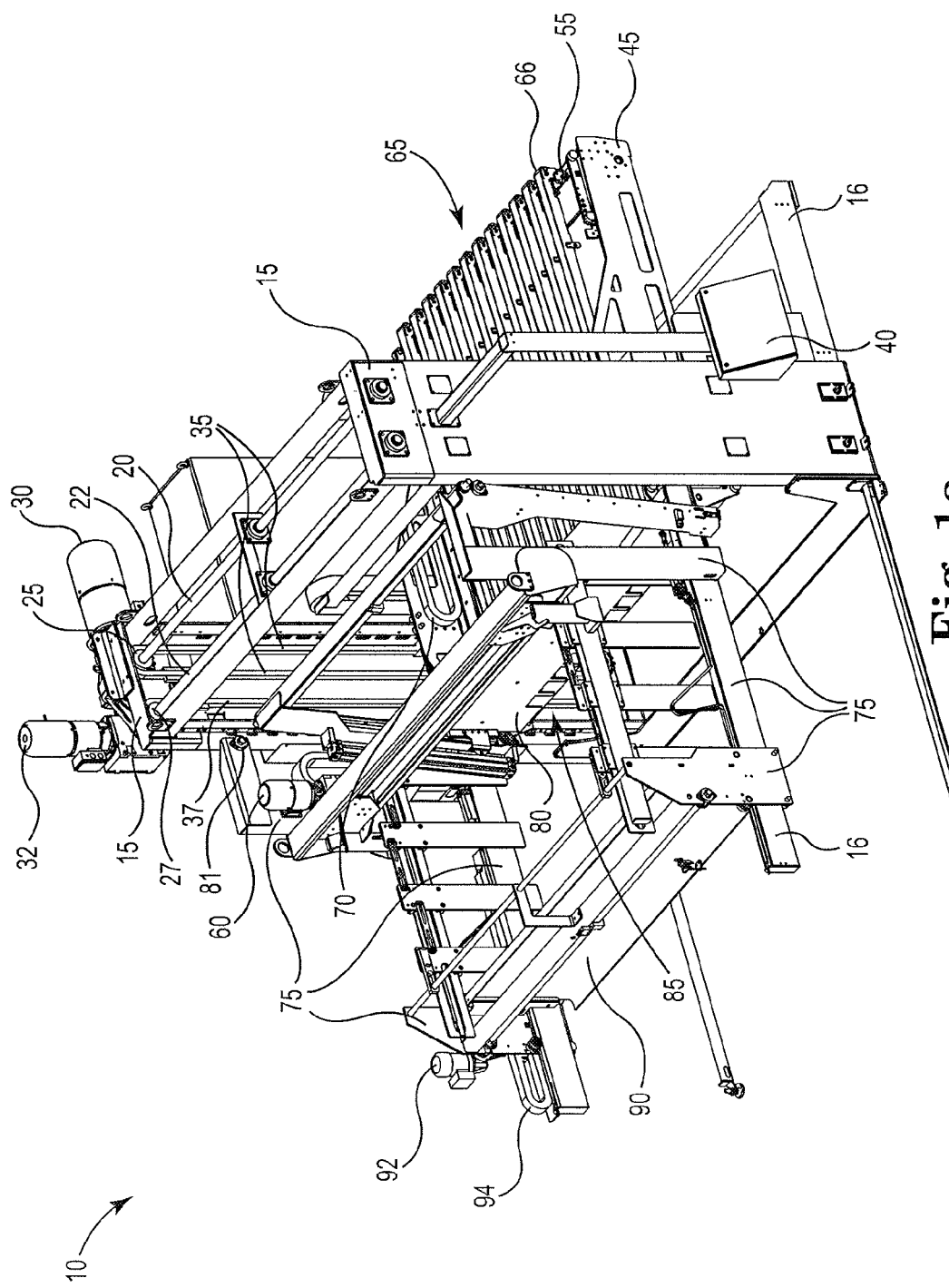
FIG. 1a is a front isometric view of a stacking device in accordance with one embodiment of the present disclosure.
Figure 1B:
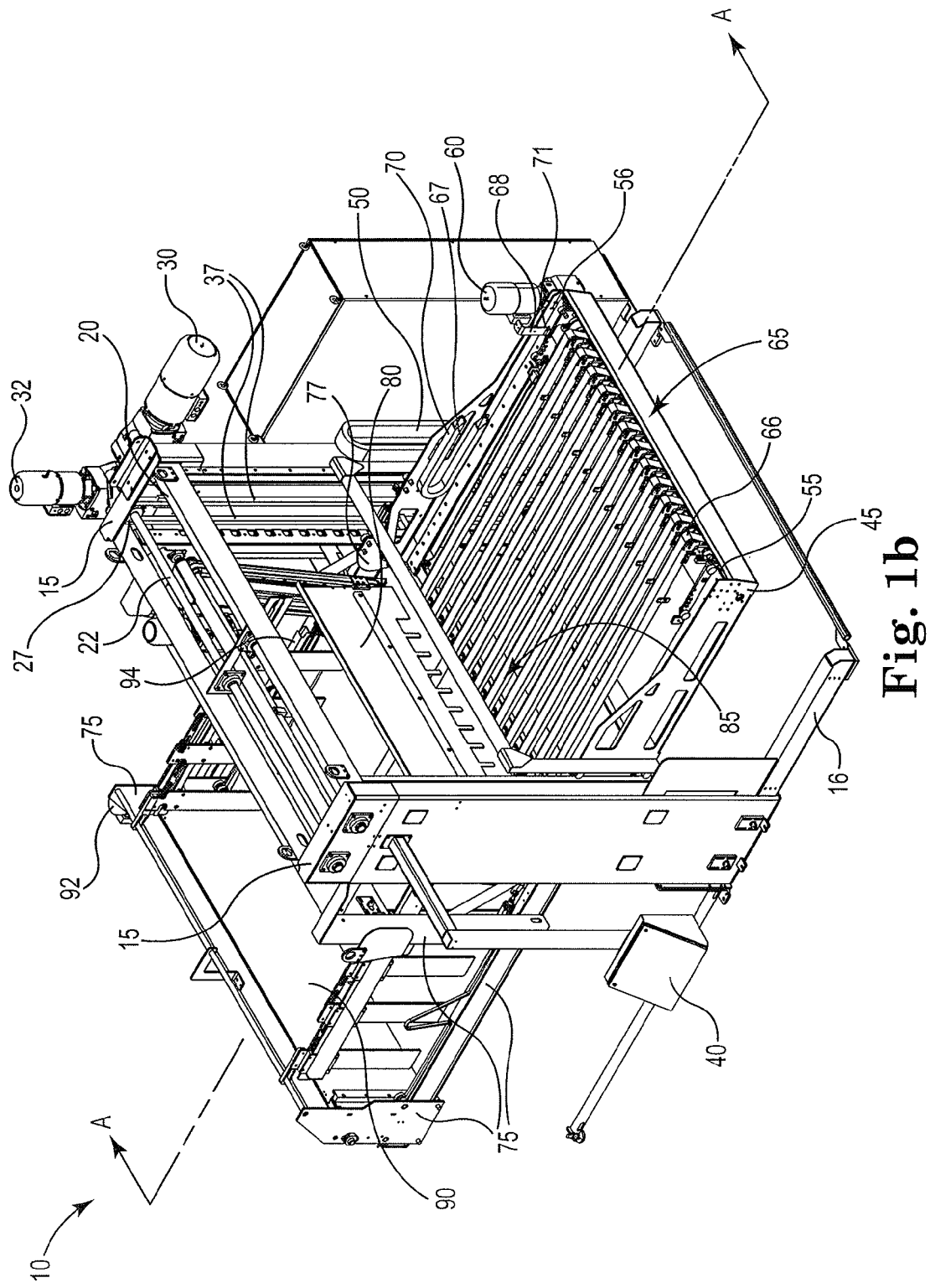
FIG. 1b is a rear isometric view of a stacking device in accordance with one embodiment of the present disclosure.

FIGS. 1a and 1b illustrate front and rear isometric views, respectively, of one embodiment of such an apparatus. Referring to FIGS. 1a and 1b, a stacking device 10 is shown including a frame or gantry 15. Depending upon the embodiment ultimately implemented, the stacking device 10 and gantry 15 may be formed using metallic, semi-metallic, plastic materials, other materials, or combinations thereof. The gantry 15 is illustrated as having two portions substantially vertical with respect to the ground, however, it should be appreciated that the gantry 15 may be situated at any suitable position with respect to the ground. The gantry 15 may couple to a footing or base 16, which in the illustrated embodiment is shown as a framed structure that is oriented substantially perpendicular to the gantry 15, or any other suitable orientation. Other embodiments may implement the base 16 as wheels or casters so that the stacking device 10 is mobile.

The gantry 15 also may include a plurality of generally horizontal rods 20 and 22 that extend substantially between the two upright portions of the gantry 15. The rods 20 and 22 may couple to one or more pinions or gears 25 and 27 within the gantry 15 (best illustrated in FIG. 1a). The rod 20 may further couple to a first vertical motor 30 that actuates movement of the rod 20 in a clockwise and/or counter-clockwise direction. Similarly, the rod 22 may further couple to a second vertical motor 32 that actuates movement of the rod 22 in a clockwise and/or counter-clockwise direction.

The gear 25 may couple to a belt 35 (best shown in FIG. 1a) and may be oriented in a direction that is substantially parallel to the major axis of the gantry 15, which in the illustrated embodiment is generally vertical. Similarly, the gear 27 may couple to a belt 37 and may be oriented in a direction that is substantially parallel to the major axis of the gantry 15, which in the illustrated embodiment is generally vertical. Although the belts 35 and 37 are illustrated in FIGS. 1a and 1b as chain-driven belts that interface with teeth on the gears 25 and 27, the belts 35 and 37 may take on a variety of forms and be made from a variety of materials. For example, in some embodiments, the belts 35 and 37 may be serpentine belts where the gears 25 and 27 are replaced with pulleys having grooves that seat the serpentine belts. Further, in some embodiments, the gears 25 and 27 and the rods 20 and 22 may be a single unitary piece or may be or function as a direct drive. For example, in some embodiments, the outer periphery of the rods 20 and 22 may include teeth such that the ends of the rods 20 and 22 directly drive the belts 35 and 37.

The gantry 15 may couple to a control housing 40. The control housing 40 may include circuitry for programming and/or controlling the motion of the stacking device 10. In some embodiments, this circuitry may include microcontrollers, microprocessor, sensing devices, user interface devices, and/or memory. The gantry 15 may further couple to a table 45 via the belt 35 and other gearing. As will be described in greater detail below, the belt 35 and motor 30 may move the table 45, including generally vertically, with respect to the gantry 15. The gantry 15 may couple to a vertical stop 50 (best shown in FIG. 1b) that limits the overall generally vertical movement of the table 45 as it moves.

The table 45 may couple to a generally horizontal rod 55 that extends between generally horizontal portions of the table 45. Each end of the rod 55 may couple to one or more pinions or gears 56 that drive movement of the table 45 laterally with respect to the gantry 15. Although the table 45 is shown in a substantially horizontal arrangement in the illustrated embodiment, the table 45 may be oriented at many different angles with respect to the gantry 15. Akin to the rods 20 and 22, the rod 55 and gears 56 may be a single unitary piece in some embodiments. The gears 56 may couple to a lateral motor 60.

The table 45 may further couple to a plurality of metal forks 65. FIG. 1c illustrates a rear isometric view of the forks 65 with certain portions of the stacking device 10 omitted for ease of discussion. Depending upon the embodiment ultimately implemented, the metal forks 65 may be arranged in a variety of formations. For example, in the illustrated embodiment of FIGS. 1a-1c, the forks 65 are illustrated in a substantially planar formation where each of the forks is substantially in the same plane as an initial fork 66, however, other embodiments are possible where every other fork in the plurality is in substantially the same position as the fork 66 and the other forks within the plurality are offset from the position of the fork 66. The fork 66 will be discussed in greater detail below with respect to FIGS. 2a-2d.

Referring to FIGS. 1b and 1c, the forks 65 may couple to a stop tab 67 (shown in FIG. 1b) via a coupling tab 68. As the motor 30 rotates, the belt 35 may cause the table 45 to move vertically within the gantry 15. When the stop tab 67 meets the vertical stop 50, the vertical movement of the forks 65 may be limited. By modifying the dimensions of the stop 50 and/or the stop tab 67, the overall generally vertical movement of the table 45 may be varied between embodiments.

The motor 60 may move the forks 65 laterally with respect to the gantry 15. The forks 65 may couple to a lateral stop 70 via a bend 71 in the coupling tab 68 (best shown in FIGS. 1b and 1c), where the stop 70 prevents the forks 65 from moving laterally toward the gantry 15 (i.e., to the right in FIGS. 1a and 1b) as the bend 71 meets the lateral stop 70. Accordingly, the lateral movement of the forks 65 may be modified by modifying the dimensions of the stop 70 and/or the dimensions of the bend 71.

Referring still to FIGS. 1a and 1b, the belt 37 may couple to a second frame or gantry 75 via a link 77 (best shown in FIG. 1b). As shown, the link 77 may couple to the belt 37 and ride along the gantry 15. In this manner, as the motor 32 rotates and the belt 37 moves, the link 77 may move the gantry 75 substantially vertically with respect to the gantry 15. Although not specifically shown in FIGS. 1a and 1b, the table 45 may have a similar coupling mechanism to the gantry 15. Because the gantry 75 and the table 45 may ride along the gantry 15, in some embodiments, the gantry 15 may be manufactured using a materials that are substantially thicker and/or more resilient than the other materials in the stacking device 10.

In some embodiments, the gantry 75 may be configured to suspend a backstop 80 via a hinge 81 (hinge 81 is best shown in FIG. 1b). As shown, the backstop 80 may include a plurality of tines 85. Unlike conventional approaches where items are conveyed using a belt extending the full width of the stacking device 10, embodiments of the stacking device 10 that implement the forks 65 allow the tines 85 of the backstop 80 to interdigitate with the forks 65. As will be described in greater detail below, because the tines 85 interdigitate with the forks 65, the backstop 80 may extend below the forks 65, thereby causing successive items to be aligned with previously stacked items.

As the gantry 75 moves substantially vertical with respect to the gantry 15, items like the backstop 80 may move substantially vertical with respect to the gantry 15 and substantially independent of the vertical movement of the forks 65. Thus, unlike conventional approaches, stacked items may be squared separately from vertically lifting or positioning. This will be described in greater detail below.

Depending upon the embodiment ultimately implemented, the backstop 80 may be maneuvered about forks 65 in a variety of ways. For example, in some embodiments, the backstop 80 may move angularly about the hinge 81. The backstop 80 may be lifted in a substantially vertical direction with respect to the gantry 15 as the gantry 75 is moved in a substantially vertical direction with respect to the gantry 15. In this manner, items on the forks 65 to pass underneath the backstop 80. Regardless of the method for maneuvering the backstop 80 about the forks 65, the tines 85 and the forks 65 may maintain sufficient separation between the tines 85 and the forks 65 such that items are not pinched between the tines 85 and the forks 65 as they are conveyed through the stacking device 10. Furthermore, it should be appreciated that the backstop 80 is not required, and that embodiments of the disclosure are possible that do not employ the backstop 80. In fact, as will be described in greater detail below, another set of forks substantially identical to the forks 65 may be employed directly beneath the forks 65 in the embodiments where the backstop 80 is omitted.

Referring still to FIGS. 1a and 1b, the stacking device 10 also may include a squaring plate 90. As shown in the illustrated embodiment, the squaring plate 90 may couple to the gantry 75. The gantry 75 may couple to a motor 92 and may couple to a stop 94 (best shown in FIG. 1a). The motor 92 may move the squaring plate 90 laterally both toward the backstop 80 and away from the backstop 80. As will be described in further detail below, the squaring operation of stacked items using the backstop 80 and the squaring plate 90 may be performed separate from the vertical lift operations performed by the forks 65. In this manner, the forks 65 may be free to obtain additional items for stacking while squaring operations are taking place, thereby increasing throughput of the stacking device.

Figure 2A:
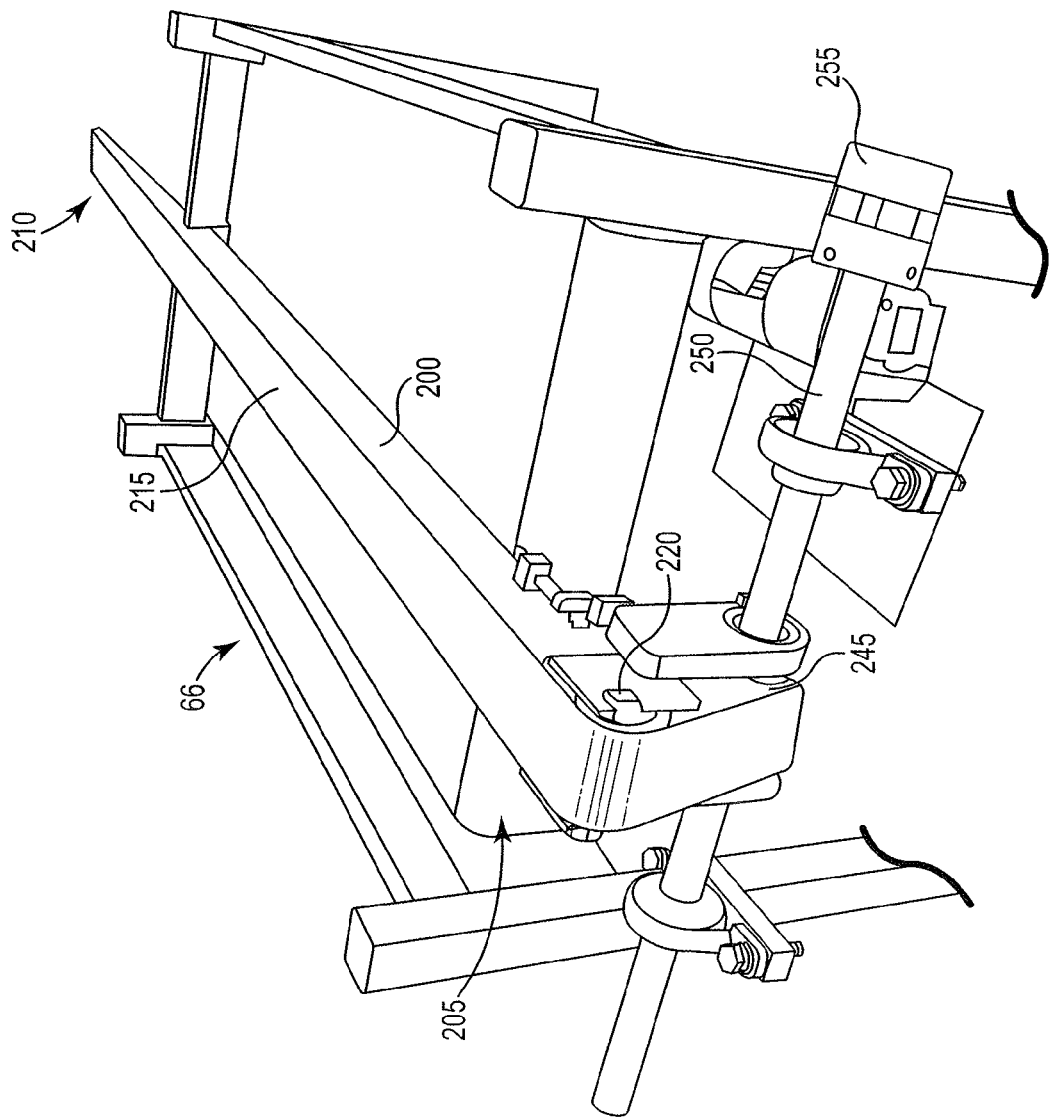
FIG. 2a is a perspective view of a fork in accordance with one embodiment of the present disclosure.

FIGS. 2a-2d illustrate the single fork 66 from FIGS. 1a-1c in greater detail. Referring first to FIG. 2a, a perspective view of the fork 66 is shown. The fork 66 may include a metallic frame 200 that is generally tapered or decreasing in thickness as it progresses longitudinally from a proximal end 205 to a distal end 210. Of course, the overall degree of tapering shown in FIGS. 2a-2d is merely representative and may vary based upon the embodiment ultimately implemented. The decrease in thickness may allow the plurality of forks 65 (shown in FIGS. 1a and 1b) to be placed closer to a stack of items than if the forks 65 were not tapered. For example, if the fork 66 had uniform thickness in the longitudinal direction, then the distal end 210 may be too voluminous, thereby prohibiting the fork 66 from being placed close to a previously stacked item without modifying its position. Further, if the fork 66 had uniform thickness in the longitudinal direction, but were made relatively thin so that the distal end 210 were not voluminous, then the fork 66 may not be rigid enough to support the weight of items on being conveyed across the plurality of forks 65.

While FIG. 2a illustrates an embodiment of the fork 66 manufactured using metal (such as aluminum), in other embodiments the fork 66 may be manufactured using plastics, composite materials, or combinations thereof.

Referring still to FIG. 2a, the fork 66 also may include an integrated endless band or belt 215 that extends longitudinally along the fork 66. Depending upon the embodiment ultimately implemented, the belt 215 may be made of a variety of materials and configurations. For example, in some embodiments, the belt 215 may be made from a single rubber layer. In other embodiments, the belt 215 may be made of multiple layers that include an underlying layer, which provides linear strength, and a cover layer over the underlying layer. In these embodiments, the underlying layer may be cotton and/or metallic composites and the cover layer may be plastic, rubber, or combinations thereof. Additionally, in some embodiments, the belt 215 may include one or more grooves to increase gripping strength of the plurality of forks 65. As shown in FIG. 2a, the proximal end 205 may include an idler pulley 220 on which the belt 215 rides.

FIGS. 2b and 2c illustrate, respectively, top and bottom perspective views of the fork 66 as viewed from the distal end 210. Referring now to FIGS. 2b and 2c, the distal end 210 also may include an idler pulley 225 on which the belt 215 rides. In the illustrated embodiment, the pulley 225 rides in a slot 226 so that the tension of the belt 215 may be adjusted by adjusting the position of the pulley 225 in the slot 226.

FIG. 2c best illustrates the path of travel for the belt 215 as it passes over the pulley 225. As shown in FIG. 2c, the belt 215 may be threaded through a channel 230. During normal operation, the belt 215 may roll about the pulley 225 and pass through the channel 230 on its return path back to the proximal end 205. In the embodiment illustrated in FIG. 2c, the channel 230 is shown as including a notch or opening 235, however, other embodiments are possible where the channel 230 extends substantially across the belt 215 without any openings. The notch 235 may allow the belt 215 to be threaded into the channel 230.

Referring still to FIG. 2c, the channel 230 includes left and right strips or tabs 240a and 240b through which the belt 215 passes. As shown, these tabs 240a and 240b may be rounded on the ends so as to provide a smooth edge for the interface of the belt 215. Although embodiment in FIG. 2c illustrates the tabs 240a and 240b as substantially symmetric in dimension, some embodiments may implement the tabs 240a and 240b asymmetrically such that one or the other of the tabs 240a or 240b may be larger than the other and the notch 235 may be non-centered across the fork 66. As will be described in greater detail below, the tabs 240a and 240b may rest upon one or more previously stacked items while the fork 66 conveys the next item in the stack. Such an approach may overcome problems of conventional approaches inasmuch as the belt 215 may convey the next item in the stack while not catching on previously stacked items.

Furthermore, although the embodiment shown in FIG. 2c illustrates a single channel 230, other embodiments may include multiple channels progressively formed on top of each other. For instance, tabs 240a and 240b may have an additional set of tabs formed beneath them to interface with a pallet or other machinery.

Figure 2D:
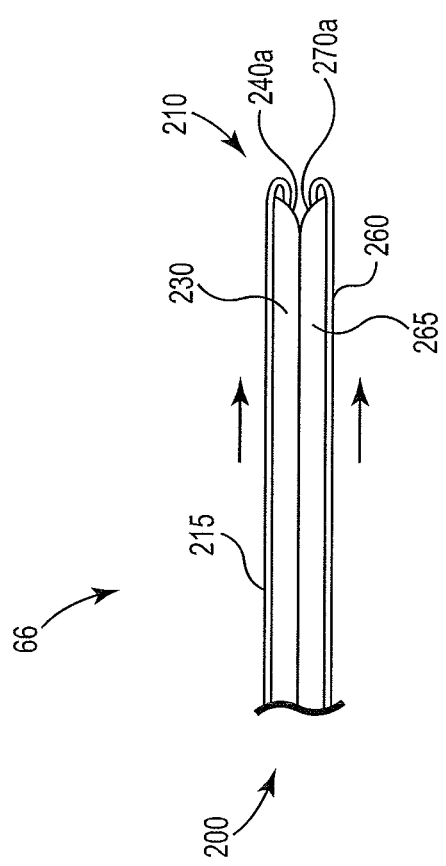
FIG. 2d is a section view of a fork in accordance with one embodiment of the present disclosure.

Additionally, as illustrated in the alternate embodiment of FIG. 2d, the fork 66 may include an additional belt 260 that runs in conjunction with the belt 215. In the illustrated embodiment, the belt 260 is shown operating counter-clockwise while the belt 215 operates clockwise, but the belts may run in the same direction in either a clockwise or counter-clockwise manner and the belts may run at different or the same speeds. The belts 215 and 260 may rotate in separate channels 230 and 265 so as to not interfere with each other. Akin to the belt 215 rotating and running into the channel 230 created by the tabs 240a and 240b, the belt 260 may rotate and run into the channel 265 created by the tabs 270a and 270b (270b not specifically shown in FIG. 2d). This arrangement may be desirable when the fork 66 is being used without the backstop 80, where the top belt 215 may convey the item to be stacked while the bottom belt 260 rests on the previously stacked item and assists in retracting the fork 66 as the item to be stacked is stacked on the previously stacked item. Of course, the embodiment of FIG. 2d also may be used in embodiments that implement the backstop 80.

Referring to FIG. 2a, the fork 66 may include a drive pulley 245. The drive pulley 245 may couple to a rod 250. Other forks in the plurality of forks 65 (the plurality 65 is shown in greater detail in FIG. 1c) may couple to the rod 250. The rod 250 also may couple to a coupler 255 that may further couple to one or more drive motors (not specifically shown in FIG. 2a). Rotation of the rod 250 may cause the pulley 245, and consequently the belt 215, to move in a clockwise and/or counter-clockwise rotation. Thus, referring to FIGS. 2a-2c, as the rod 250 rotates, the path traveled by the belt 215 may include (in a clockwise direction) pulley 245, pulley 220 at the proximal end 205, the pulley 225 at the distal end 210, and a return to the pulley 245 through the channel 230. Although FIGS. 2a-2c illustrate the travel path for the belt 215 including a certain number of pulleys (e.g., pulleys 245, 220, and 225), the actual travel path may vary between embodiments to include a greater or fewer number of idle and/or drive pulleys than the embodiments shown in FIGS. 2a-2c.

Figure 3A:
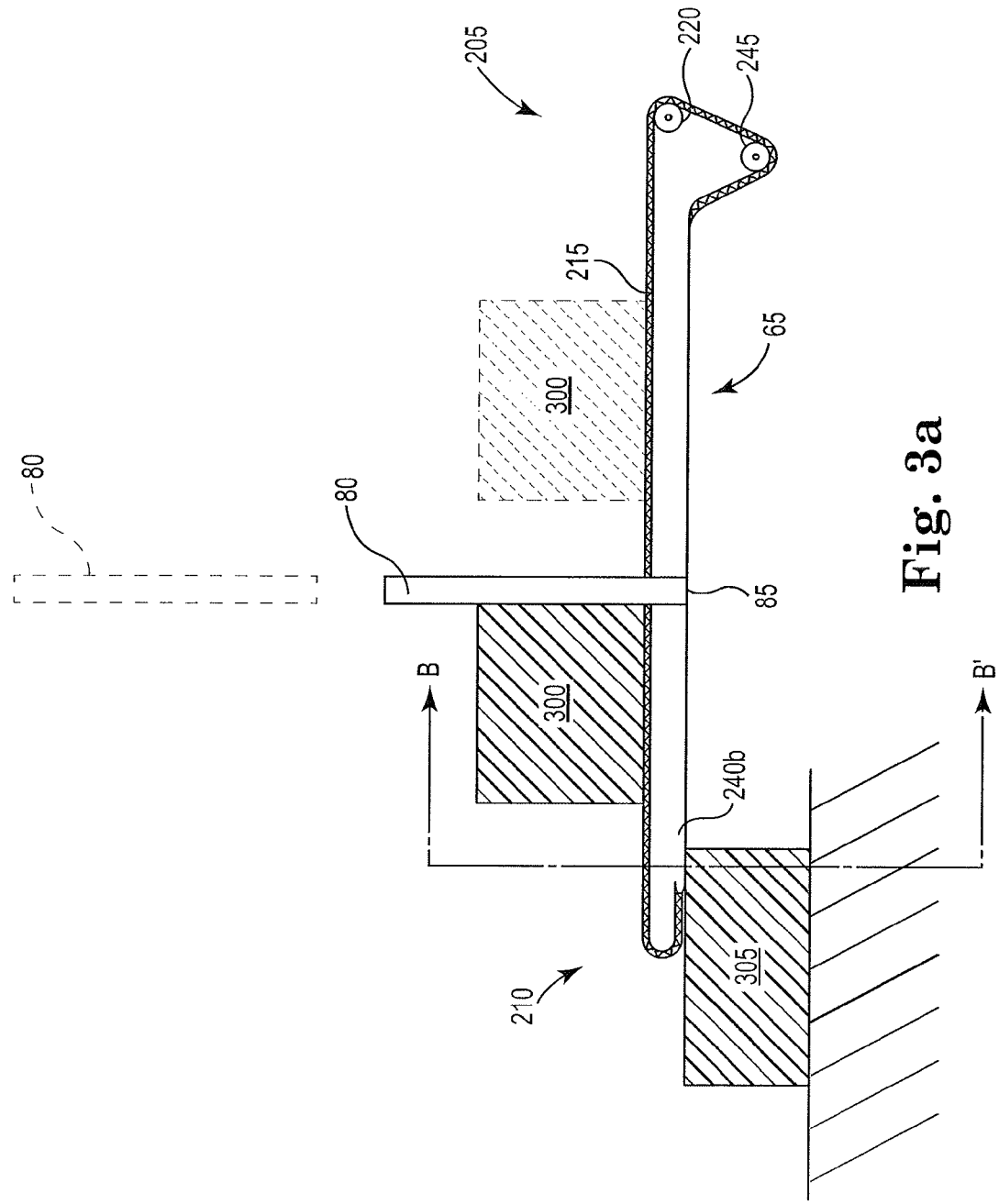
FIG. 3a is a section view taken along line AA' of FIG. 1b in accordance with one embodiment of the present disclosure.

FIG. 3a illustrates a section view of the forks 65 taken through the line AA' shown in FIG. 1b. The section line AA' is between the tines 85 and the forks 65. Thus, the tines 85 in FIG. 3a are shown as hidden when interdigitated with the forks 65. FIG. 3b illustrates a section view of the forks 65 taken along the line BB' shown in FIG. 3a. For ease of discussion, the other portions of the stacking device 10, such as gantry 75 and backstop 80 shown in FIGS. 1a and 1b, are not specifically shown in FIGS. 3a and 3b.

Referring to FIGS. 3a and 3b, an item 300 is shown being conveyed along the forks 65 so as to be stacked on a previously stacked item 305. During normal operation, in the embodiments that employ the backstop 80, the item 300 may enter the stacking device 10 on the right of the backstop 80. This is shown in FIG. 3a by a representation of the item 300 as dashed to the right of the backstop 80. As the belt 215 is rotated the item 300 may move from the proximal end 205 to the distal end 210 of the forks 65. When the item 300 is first loaded onto the forks 65, the backstop 80 may be generally vertically offset from the forks 65. This is shown in FIG. 3a by the dashed version of backstop 80. The precise generally vertical offset may vary based upon the anticipated size of the item 300.

Figure 3C:
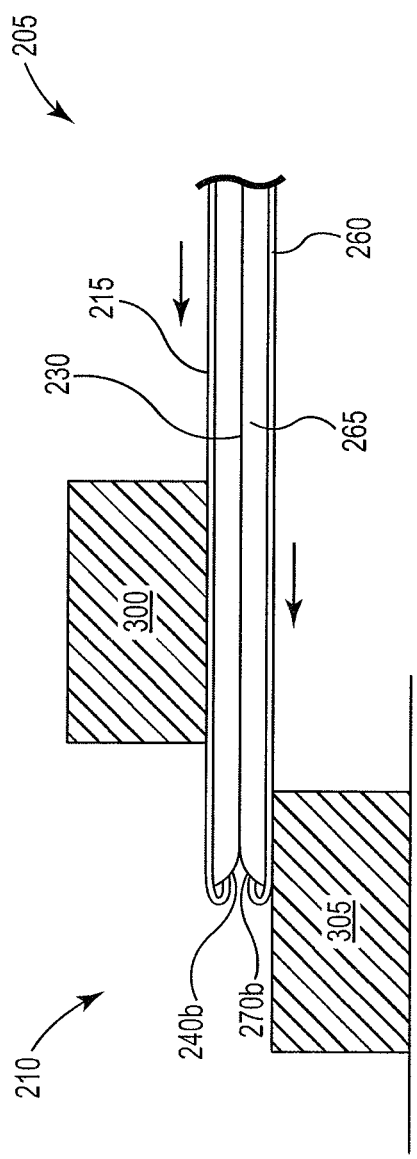
FIG. 3c is a section view of the embodiment of FIG. 2d in accordance with one embodiment of the present disclosure.

As the item 300 moves past the position of the backstop 80, then the backstop 80 may move down generally vertically such that the tines 85 interdigitate with the forks 65. In the embodiment illustrated in FIGS. 3a and 3b, the tines 85 may extend to the bottom of the forks 65, however other embodiments are possible where the tines 85 interdigitate and extend just above or just below the bottom of the forks 65. For example, in some embodiments, the tines 85 extend beneath the forks 65 to align the item 300 with the previously stacked item 305. Referring still to FIG. 3a, the item 300 may be retracted against the backstop 80 to advance the item 300 to the left in a longitudinal direction along the forks 65. This may occur by rotating the belt 215, or by moving the forks 65 in a lateral direction to the right against the backstop 80, or by combinations of rotating the belt 215 while moving the forks 65 against the backstop 80. Of course, in the embodiments where the backstop 80 is not employed, the belt 215 may advance the item 300 along the forks 65. For example, FIG. 3c illustrates the section view of FIG. 3a with the fork 66 replaced with the embodiment of FIG. 2d. In this embodiment, the item to be stacked 300 may be conveyed by the top belt 215 while the bottom belt 260 rests upon the previously stacked item 305. While the item to be stacked 300 is conveyed along the top belt 215, by the belt 215 moving counter-clockwise in FIG. 3c, the bottom belt 260 may be stationary. Then as the item 300 is coming off the belt 215, the bottom belt 260 may begin moving clockwise to remove the fork 65 off the previously stacked item 305 in coordination with the item 300 being stacked onto the previously stacked item 305.

Referring to FIGS. 3a and 3b, with the tines 85 extending to the bottom of the forks 65, as the item 300 is advanced toward the previously stacked item 305, the bottom of the tines 85 may make contact with the previously stacked item 305 thereby aligning the item 300 and the previously stacked item 305 generally vertically as the belt 215. Thus, the act of the backstop 80 making contact with the previously stacked item 305 may determine the generally horizontal position of the stack of items 300 and 305. As will be described below, the backstop 80 may be used along with squaring plate 90 to square the items 300 and 305.

Referring momentarily back to FIGS. 1a and 1b, as was mentioned above in the context of FIGS. 1a and 1b, the forks 65 may be positioned generally vertically by moving the forks 65 generally vertically within the gantry 15 through the use of the motor 30. Referring now to FIGS. 3a and 3b, as the forks 65 are positioned generally vertically, they may be positioned so that the tabs 240a and 240b rest on top of the previously stacked item 305, which may be stacked on the ground as shown in FIGS. 3a and 3b or stacked on another vertically movable lifting mechanism. The backstop 80 also may make contact with the item 300 to begin advancing the item 300 off the forks 65 as the belt 215 rotates. With the tabs 240a and 240b resting upon the previously stacked item, and the backstop 80 making contact with the item 300, the belt 215 may rotate to advance to the item 300 off the forks 65. Thus, the belt 215 may be used to both convey the item 300 along the forks 65 as well as facilitate stacking the item 300 on a previously stacked item 305.

Notably, in this embodiment, the belt 215 may move within the forks 65 without making contact with the previously stacked item 305. Unlike conventional stacking devices, the movement of the belt 215 may prevent a large drop of item 300, and consequent damage of such a drop, as item 300 is rolled off the belt 215 and placed onto item 305 because of the tapered nature of the forks 65. Further, unlike conventional stacking devices, because the belt 215 may continue to rotate within the forks 65 while resting upon the previously stacked item 305, the amount of drag between the item 300 and the belt 215 may be minimized as the backstop 80 advances the item 300 off the forks 65. This may be desirable when stacking items in boxes or containers that are aesthetically pleasing and one of the goals of the stacking process is to minimize marking the boxes or containers. Still further, whereas conventional approaches often collapse the stack of items 300 and 305 as the conventional non-belted fork retracts, embodiments that employ the belt 215 may minimize altering the overall stack of items 300 and 305.

Once the item 300 has been placed on top of the previously stacked item 305, another item may be placed on top of the forks 65 on the right side of FIG. 3a and the forks 65 may be generally vertically positioned so the tabs 240a and 240b now rest upon item 300 and then the stacking process may repeat.

Figure 4:
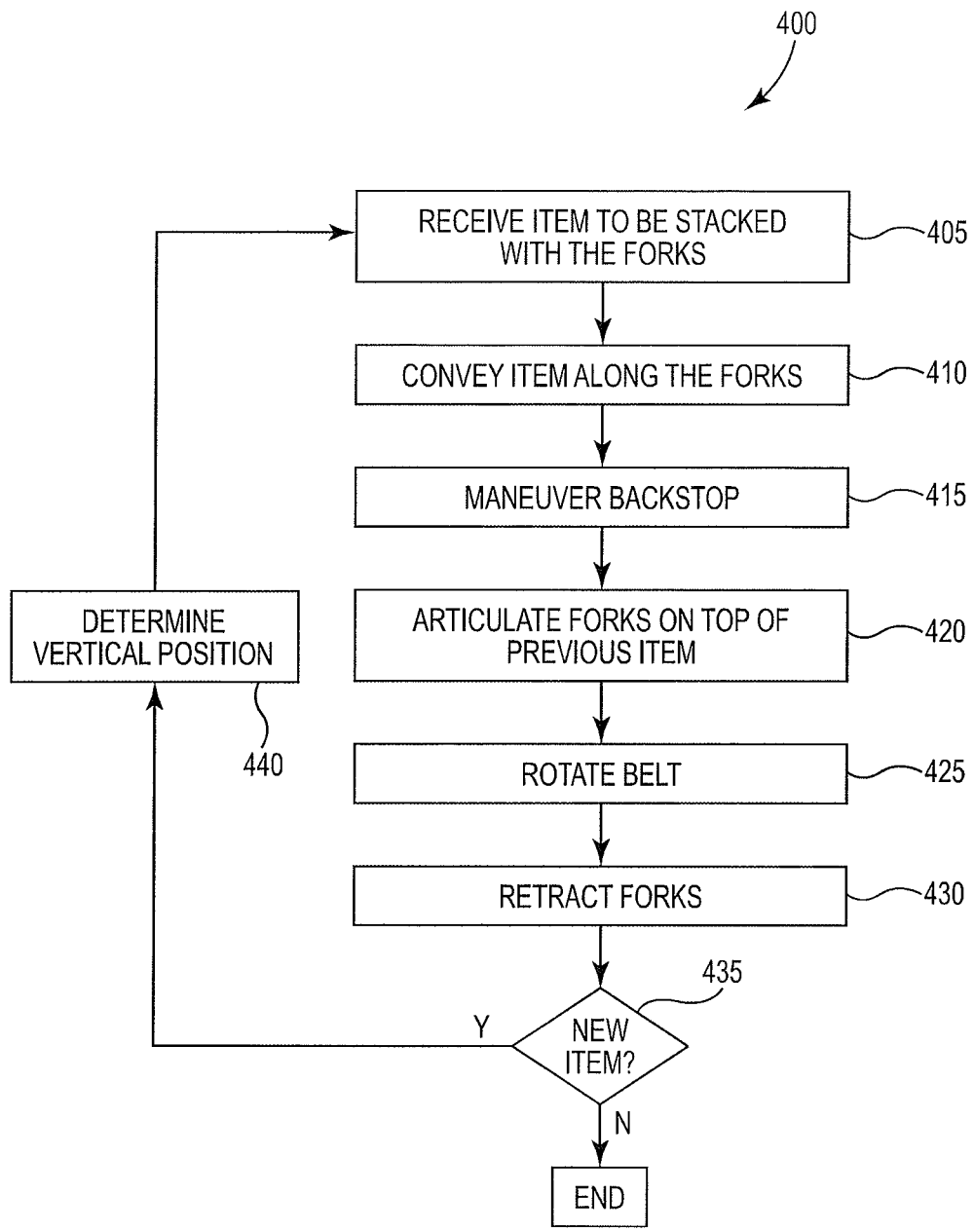
FIG. 4 is a flowchart of operations that may be performed in accordance with one embodiment of the present disclosure.

FIG. 4 illustrates operations 400 that may be used to stack item with the stacking device 10. Referring now to FIG. 4 along with FIGS. 1a-3b, the operations 400 may begin with operation 405 where the stacking device 10 receives the item 300. This may involve the forks 65 being articulated generally vertically within the gantry 15. For example, if the stacking device 10 is located in a factory setting and another device provides the item 300, then the forks 65 may be articulated generally vertically to ensure a smooth transition of item 300 to the stacking device 10.

Next, in operation 410, the item 300 may be conveyed along the forks 65 in a lateral direction toward the backstop 80. This may occur, for example, by moving the belt 215 in a counter-clockwise direction. In some embodiments, the backstop 80 may be generally vertically offset above the forks 65 so that the item 300 passes by the lateral position of the backstop 80. The stacking device 10 may include one or more infrared position sensors to tell when the item 300 has reached this position.

Once the item 300 has reached the desired lateral position along the forks 65, the backstop 80 may be maneuvered generally vertically so that the tines 85 interdigitate with the forks 65. This is illustrated in operation 415. As mentioned above, depending upon the embodiment ultimately implemented, the depth at which the tines 85 interdigitate with the forks 65 may vary.

Next, in operation 420, the forks 65 may be articulated to rest on top of the previously stacked item 305. Although the tabs 240a and 240b are shown in FIG. 3a as resting on the edge of the previously stacked item 305, the overall generally horizontal position of the forks 65 may vary between embodiments so that the forks 65 may rest on substantially all of the previously stacked item 305 in some embodiments. Further, as mentioned above, the combination of the forks 65 and the backstop 80 may be positioned such that the tines 85 of the backstop 80 make contact with the previously stacked item 305 to locate the forks 65 such that the item 300 will be substantially generally vertically aligned with the previously stacked item 305. Note that because the backstop 80 and the squaring plate 90 operate substantially independent from the forks 65, this squaring operation may occur at a later time while the forks 65 are obtaining another item to be stacked. Thus, squaring operations may occur independent of the vertical positioning operations.

Once the forks 65 are resting on the previously stacked item and are aligned generally vertically with the previously stacked item 305, the belt 215 may be rotated to remove the item 300 from the forks 65 onto the previously stacked item 305 per operation 425. Referring to FIG. 3a, this rotation may be in the counter-clockwise direction from the proximal end 205 toward the distal end 210. Of course, in the embodiments of the type shown in FIG. 3c, the rotation of the belt 215 may be coordinated to the rotation of the belt 260.

As the belt 215 rotates, per operation 425, the forks 65 may be retracted against the backstop 80 and the forks 65 moved in a lateral direction to the right so that the item 300 will gradually become stacked on top of the previously stacked item 305. This is shown in operation 430. Of course, the item 300 may be moved laterally off the forks 65 without the use of the backstop 80 in the embodiments where a backstop 80 is omitted, such as in the embodiment shown in FIG. 3c.

If there are additional items to be stacked per operation 435, then the stacking device 10 may determine a new generally vertical position for the forks 65 per operation 440. For example, the new generally vertical position may represent the top of the stack that now includes items 300 and 305. As will be described in greater detail below, in the embodiments where the stack of items 300 and 305 are squared independent of the operation of the forks 65, the position of the top of the stack may be communicated to the forks 65 so as to coordinate future stacking operations. Regardless of whether the forks 65 determine the new stack position on their own or if the stack position is communicated to the forks 65 from another device, once this new stack position has been determined, operations 405 through 435 may be repeated to stack the new item. In the event that there is no new item to be stacked (per operation 435), the operations 400 may end and the stack may be further processed by other machinery. For example, at the conclusion of the operations 400, the stack of items 300 and 305 may be transferred to a pallet or wrapped in cellophane.

FIG. 5 illustrates a section view of the backstop 80 and the squaring plate 90. The embodiment illustrated in FIG. 5 represents a squaring operation that may occur, for example, after the stacking operation shown in FIGS. 3a-3c. As shown, the forks 65 may obtain another item to be stacked 505 while the backstop 80 and the squaring plate 90 perform squaring operations on the previously stacked items 300 and 305. Such independent squaring and lifting operations may improve the overall throughput of the stacking device 10 as compared to conventional approaches. This independent operation may be especially helpful in the event that multiple squaring operations are performed on the stacked items 300 and 305.

The squaring plate 90 and/or backstop 80 may include one or more sensing devices that determines the top of the stack of items 300 and 305. As the mechanism 500 moves vertically within the stacking device 10, the top of the stack of items 300 and 305 may move vertically also. Thus, in some embodiments, the mechanism 500 may include sensing devices to determine the overall stack position, including the top of the stack. Depending upon the embodiment ultimately implemented, these sensors may be based upon different technologies including sound (acoustic sensors), opacity (optical and infrared sensors and video image processors), geomagnetism (magnetic sensors, magnetometers), reflection of transmitted energy (infrared laser radar, ultrasonic sensors, and microwave radar sensors), electromagnetic induction (inductiveloop detectors), and vibration (triboelectric, seismic, and inertia-switch sensors). In some embodiments, these sensors may be located in the backstop 80 and/or the squaring plate 90. Of course, these sensors may be located at various locations about the stacking device 10, such as on the rod 250 to indicate the location of the belt 215 and/or 260, or on the motors 30, 32, 60, and/or 92 to indicate the position of various portions of the stacking device 10.

This position of the stack as measured by the sensor may be relayed back to the stacking device 10 and/or the forks 65 so that they may position the incoming item 505 to the top of the stack. This may save the forks 65 from having to determine the top of the stack, and reduce the overall amount of time involved in stacking item 505.

Figure 6A:
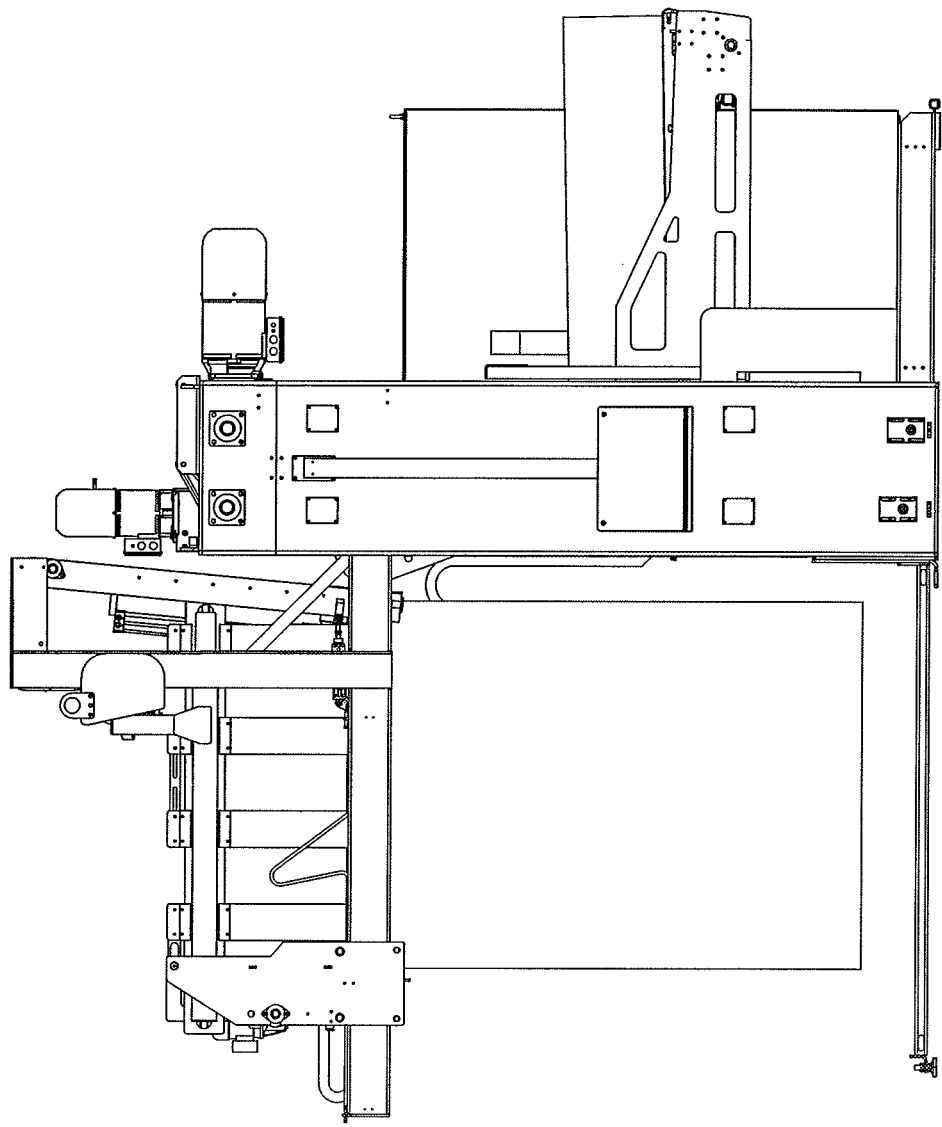
FIGS. 6a-6c are side and isometric views of the embodiment shown in FIG. 5 in accordance with one embodiment of the present disclosure.
Figure 6B:
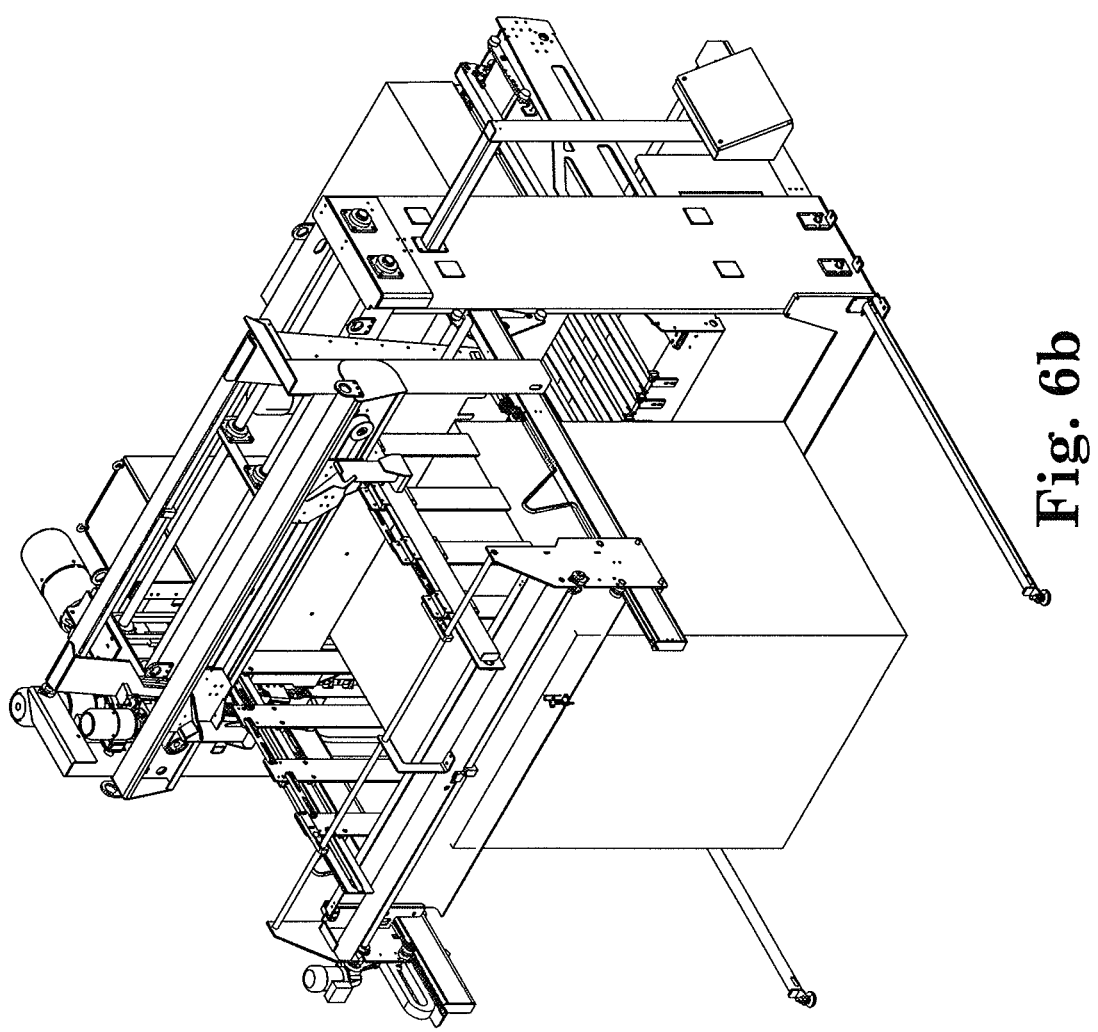
Figure 6C:
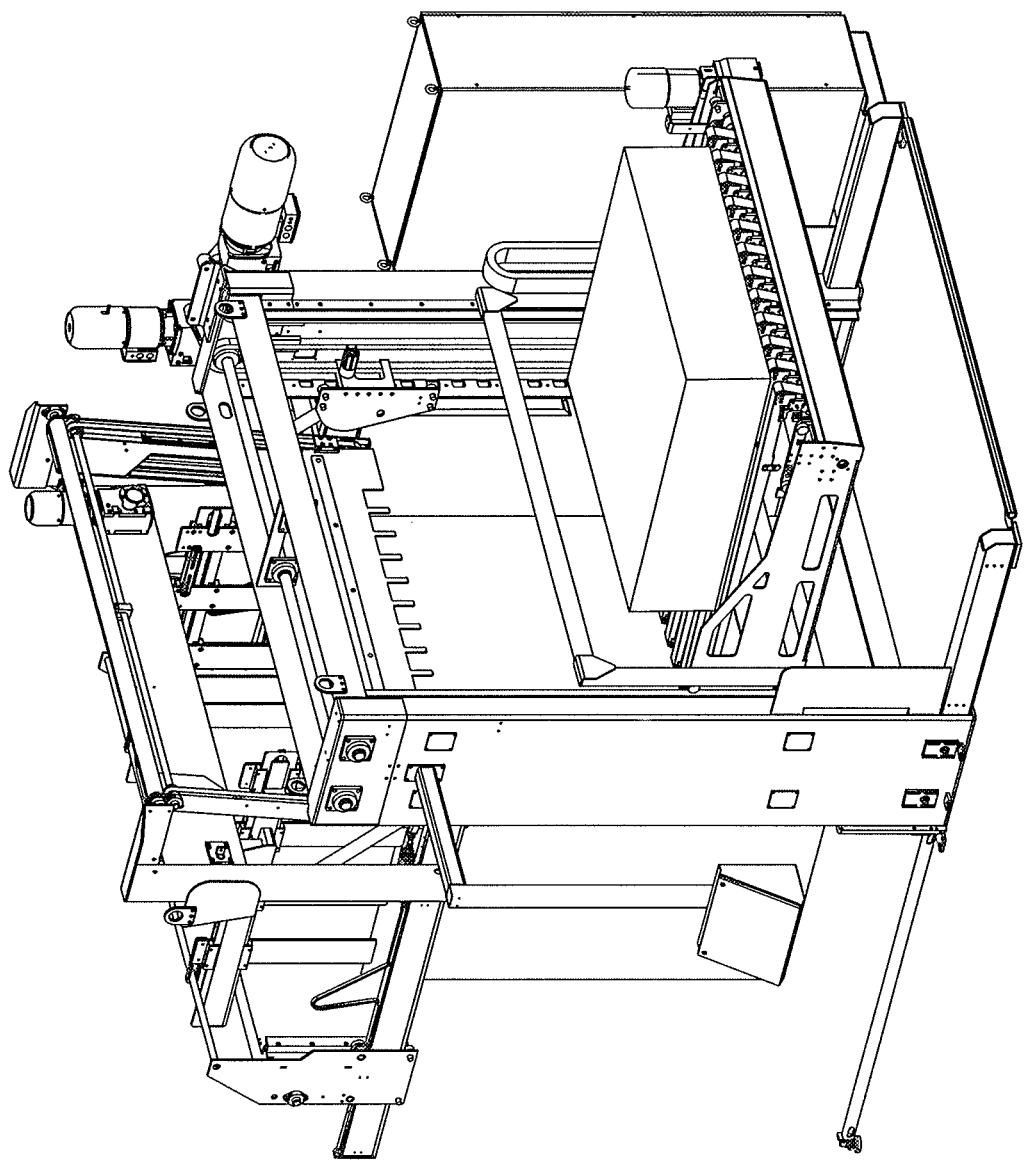

FIGS. 6a-6c are side and isometric views of the embodiment shown in FIG. 5 in accordance with one embodiment of the present disclosure.

Although the various embodiments of the present disclosure have been described, persons of skill in the art will appreciate that changes may be made in form and detail without departing from the spirit and scope of the present disclosure.

We claim:

1. A stacking device comprising:
   a first gantry;
   a plurality of belt covered forks coupled to the first gantry and adjustable to move with respect to the first gantry between a loading location and a stacking location;
   a backstop defining one or more voids through which the forks interpenetrate and through which the forks retract when the forks move from the stacking location back to the loading location; and
   a squaring mechanism coupled to a second gantry and configured to cooperate with the backstop to square a stack of items in the stacking location, wherein the squaring mechanism is adjustable to move with respect to the first gantry, and wherein the plurality of forks is capable of obtaining items for stacking in the loading location, as the squaring mechanism and the backstop operate to square the stack of items in the stacking location independently of the forks obtaining items from the loading location:
   wherein the second gantry is configured to move the backstop to a squaring location after the forks have retracted past a lateral position of the backstop.

2. A stacking device comprising:
   a table; and
   a plurality of forks coupled to the table and adjustable to move with respect to the table,
   at least one fork in the plurality comprising:
   a first belt that rotates at least partially within a first housing of the fork; and
   a second belt that rotates at least partially within a second housing of the fork;
   wherein the first belt and the second belt are independently driven such that in one mode of operation the first belt is driven while the second belt is stationary.

3. A stacking device as in claim 2, wherein the first and second belts rotate in opposite directions.

4. A stacking device as in claim 2, wherein the first belt conveys an item to be stacked while the second belt rests on a previously stacked item.

5. Apparatus including
   a table including one or more forks that are moveable between a loading location and a stacking location, said table being coupled to a first lifting element;
   at least one of said forks including a rotating belt;
   a backstop defining one or more voids through which said forks can interpenetrate and through which the forks retract when the forks move from the stacking location back to the loading location, said backstop being coupled to a second lifting element; wherein
   the first lifting element is configured to lift the forks independently of the backstop; and
   the second lifting element is configured to move the backstop to a squaring location after the forks have retracted past a lateral position of the backstop.

6. Apparatus as in claim 5, including
   a lateral movement element coupled to said table;
   wherein said lateral movement element is disposed to position at least one of said forks through at least one of said voids.

7. Apparatus as in claim 5, wherein said at least one of said forks includes a rotating belt configured to move an object laterally toward said backstop.

8. Apparatus as in claim 5, wherein said first lifting element has a range including a location above said second object.

9. Apparatus as in claim 5, wherein said second lifting element is disposed to position at least one of said voids over at least one of said forks.

10. Apparatus as in claim 5, wherein said at least one of said forks including a rotating belt is disposed to align a first object and a second object laterally with respect to said backstop.

11. Apparatus as in claim 10, including
    a lateral movement element coupled to said backstop; wherein
    when said backstop and said forks are interpenetrated, and when said rotating belt is aligning said first object and said second object;
    said lateral movement element is disposed to move said backstop toward said second object.

12. Apparatus as in claim 5, including
    a squaring element coupleable to said first object and said second object, providing an aligned stack thereof.

* * * * *